United States Patent Office.

JAMES FISCHER, OF ST. LOUIS, MISSOURI.

Letters Patent No. 66,315, dated July 2, 1867.

---

IMPROVED MEDICINE.

---

*The Schedule referred to in these Letters Patent and making part of the same.*

---

TO ALL WHOM IT MAY CONCERN:

Be it known that I, JAMES FISCHER, of St. Louis, in the county of St. Louis, State of Missouri, have invented a new and useful medicine, which, from the successful application thereof to cure intermittent fevers and ague, and such other diseases caused by miasmatic swamp air and exposure to damp weathers as are common to low lands fringing rivers or swamps, I have named Infallible Remedy for Intermittent Fevers, Ague, &c.

To enable those skilled in the preparation of medicines to brew, concoct, and compound my said remedy and properly administer the same, I will now describe the ingredients thereof and their compounding. I take seven ingredient parts, which are compounded from mercantile chemicals as now to be described:—

1. I take of mercantile sulphate of quinine twenty (20) grains, apothecaries' weight; this I dissolve in one-half (½) ounce (fluid weight) of distilled water, and add, to aid the proper dissolving process and perfect the solution, say four (4) drops of mercantile sulphuric acid.

2. I take of mercantile rhubarb four (4) ounces, of aloes Cocotrina two ounces, (all apothecaries' weight;) pour thereon two (2) pints of weak alcohol; allow the solution to macerate during fifteen (15) days, then express and filter through paper.

3. I take of powdered red cinchona four (4) ounces, of dried orange-peel three (3) ounces, of Virginia snake-root ten (10) drams, of saffron two (2) drams, of powdered cochineal one (1) dram, (all said weights being measured in apothecaries' weight,) and place thereon two (2) pints of weak alcohol and macerate during fifteen (15) days, then express and filter through paper.

4. I take of gentian root three (3) ounces, of dried orange-peel ten (10) drams, of aromatic calamus five (5) drams, hereto adding of alcohol two (2) pints; macerate during fifteen (15) days, express, and filter through paper.

5. I take of powdered colombo root five (5) ounces, and of alcohol two (2) pints; macerate during fifteen (15) days, express, and filter the solution.

6. I take of powdered myrrh five (5) ounces, and of alcohol two (2) pints; macerate for fifteen days and express and filter.

7. I take of arnica flowers five (5) ounces, of alcohol two (2) pints; macerate during fifteen days, express, and filter through paper.

Having thus formed the ingredients of my said remedy, I do now compound them in the manner following: I take of the sulphate of quinine solution twenty grains, (apothecaries;) I take of the solution of rhubarb and aloes one-half ounce; I take of the tincture of cinchona (compound) one ounce; I take of the tincture of gentian compound one-half ounce; I take of the tincture of myrrh two drams; I take of the tincture of colombo one-half ounce; I take of the tincture of arnica two drams; I take of distilled water five ounces, all being fluid weight and taken of the said ingredients as prepared according to prescription heretofore given and marked 1, 2, 3, 4, 5, 6, and 7. All said parts so taken are simply mixed and they then form my said medicine. Hereof in cases of fever in adults I prescribe eight (8) or nine (9) tablespoonful doses per day of twelve (12) hours. The dose for children is diminished in accordance with their ages.

Having now fully described my said remedy, what I claim, and desire to secure by Letters Patent, is—

The chemical compound, when composed of the ingredients and used substantially as and for the purposes set forth.

J. FISCHER.

Witnesses:
M. RANDOLPH,
GEO. P. HERTHEL, Jr.